United States Patent
Abedini et al.

(10) Patent No.: US 10,455,485 B2
(45) Date of Patent: Oct. 22, 2019

(54) METHOD AND APPARATUS FOR FREQUENCY SCAN IN NARROW BAND—INTERNET OF THINGS (NB-IOT) SYSTEMS

(71) Applicant: QUALCOMM Incorporated, San Diego, CA (US)

(72) Inventors: Navid Abedini, Raritan, NJ (US); Chun-Hao Hsu, San Jose, CA (US); Amit Mathur, Morganville, NJ (US); Sathyadev Venkata Uppala, Bridgewater, NJ (US); Wingip Tam, Marlboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/963,074

(22) Filed: Apr. 25, 2018

(65) Prior Publication Data
US 2018/0317161 A1 Nov. 1, 2018

Related U.S. Application Data

(60) Provisional application No. 62/491,919, filed on Apr. 28, 2017.

(51) Int. Cl.
| | | |
|---|---|---|
| *H04W 48/16* | (2009.01) | |
| *H04J 11/00* | (2006.01) | |
| *H04W 72/04* | (2009.01) | |
| *H04W 48/20* | (2009.01) | |
| *H04W 48/18* | (2009.01) | |
| *H04W 84/12* | (2009.01) | |

(52) U.S. Cl.
CPC ......... *H04W 48/16* (2013.01); *H04J 11/0086* (2013.01); *H04W 48/18* (2013.01); *H04W 48/20* (2013.01); *H04W 72/0453* (2013.01); *H04W 84/12* (2013.01)

(58) Field of Classification Search
CPC ..... H04W 48/18; H04W 48/20; H04W 84/12; H04W 72/0453
See application file for complete search history.

(56) References Cited

U.S. PATENT DOCUMENTS

| | | | |
|---|---|---|---|
| 7,599,335 B2 | 10/2009 | Zalio et al. | |
| 8,467,787 B2 | 6/2013 | Wu | |
| 2005/0075125 A1 | 4/2005 | Bada et al. | |
| 2007/0010280 A1* | 1/2007 | Zalio ................. | H04B 1/70735 455/525 |
| 2010/0184395 A1* | 7/2010 | Bagge .................. | H04W 48/16 455/161.1 |

(Continued)

FOREIGN PATENT DOCUMENTS

CN 101883411 A 11/2010

*Primary Examiner* — Jaime M Holliday
(74) *Attorney, Agent, or Firm* — Patterson & Sheridan, LLP

(57) ABSTRACT

Techniques for efficient and accurate frequency scans in Narrow Band-Internet of Things (NB-IoT) systems are provided. In an example, a user equipment (UE) searches for a cell on at least one of a plurality of frequency rasters based on a multi-stage search technique, wherein each stage of the multi-stage search searches the at least one frequency raster based on a different set of search parameters. The UE detects a cell on at least one of the frequency rasters based on the searching.

25 Claims, 14 Drawing Sheets

(56) References Cited

U.S. PATENT DOCUMENTS

| | | | |
|---|---|---|---|
| 2011/0007644 A1* | 1/2011 | Walker | H04B 1/709 |
| | | | 370/252 |
| 2012/0026941 A1* | 2/2012 | Ahmad | H04W 48/16 |
| | | | 370/328 |
| 2013/0130724 A1* | 5/2013 | Kumar Reddy | H04W 36/08 |
| | | | 455/456.6 |
| 2013/0150012 A1* | 6/2013 | Chhabra | H04W 48/16 |
| | | | 455/418 |
| 2017/0013548 A1 | 1/2017 | Manne et al. | |
| 2017/0265156 A1* | 9/2017 | Xue | H04W 56/001 |

* cited by examiner

METHOD AND APPARATUS FOR FREQUENCY SCAN IN NARROW BAND—INTERNET OF THINGS (NB-IOT) SYSTEMS

CLAIM OF PRIORITY UNDER 35 U.S.C. § 119

The present Application for patent claims priority to Provisional Application No. 62/491,919, entitled "METHOD AND APPARATUS FOR FREQUENCY SCAN IN NARROW BAND-INTERNET OF THINGS (NB-IOT) SYSTEMS", filed on Apr. 28, 2017, and hereby expressly incorporated by reference herein.

FIELD

Aspects of the present disclosure relate to wireless communications, and more particularly, to techniques for efficient frequency scan in Narrow Band-Internet of Things (NB-IoT) systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications that may be performed by a User Equipment (UE). The method generally includes searching for a cell on at least one of a plurality of frequency rasters based on a multi-stage search technique, wherein each stage of the multi-stage search searches the at least one frequency raster based on a different set of search parameters, and detecting a cell on at least one of the frequency rasters based on the searching.

Certain aspects of the present disclosure provide an apparatus for wireless communication by a UE. The apparatus generally includes means for searching for a cell on at least one of a plurality of frequency rasters based on a multi-stage search technique, wherein each stage of the multi-stage search searches the at least one frequency raster based on a different set of search parameters, and means for detecting a cell on at least one of the frequency rasters based on the searching.

Certain aspects of the present disclosure provide an apparatus for wireless communication by a UE. The apparatus generally includes at least one processor and a memory coupled to the at least one processor. The at least one processor is generally configured to search for a cell on at least one of a plurality of frequency rasters based on a multi-stage search technique, wherein each stage of the multi-stage search searches the at least one frequency raster based on a different set of search parameters, and detect a cell on at least one of the frequency rasters based on the searching.

Certain aspects of the present disclosure provide a computer-readable medium for wireless communications by a UE. The computer-readable medium generally stores instructions which when processed by at least one processor performs a method including searching for a cell on at least one of a plurality of frequency rasters based on a multi-stage search technique, wherein each stage of the multi-stage search searches the at least one frequency raster based on a different set of search parameters, and detecting a cell on at least one of the frequency rasters based on the searching.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
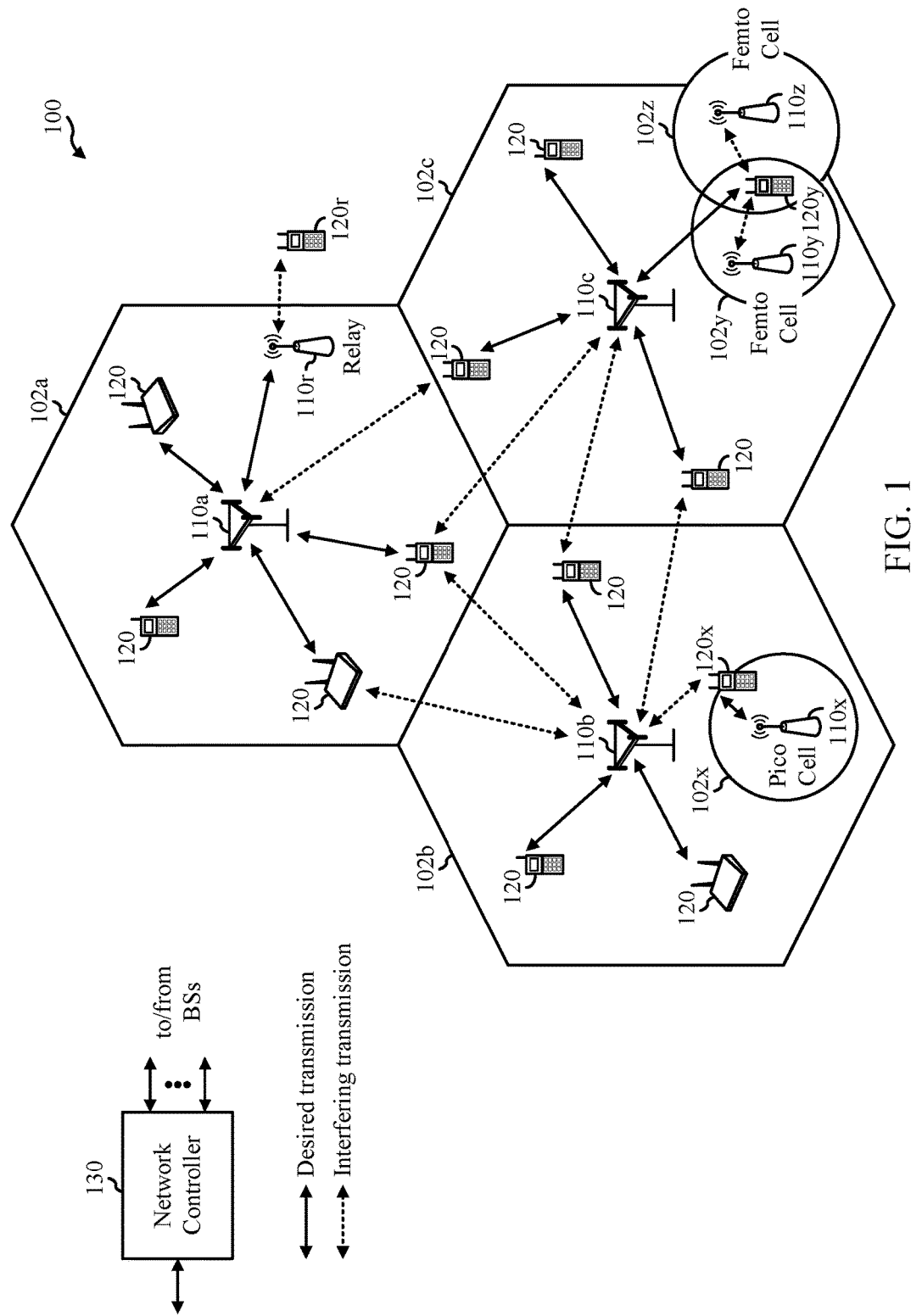
FIG. 1 is a block diagram conceptually illustrating an example telecommunications system, in accordance with certain aspects of the present disclosure.

The objectives for Narrow Band-Internet of Things (NB-IOT) devices generally include low cost, long battery life, deep, and/or wide coverage. In certain aspects, the target devices may be buried deep underground needing support for very weak communication links (e.g., as low as −12 dB SNR or even lower).

A UE during initial acquisition, for example when the UE device powers up, generally searches a list of frequency locations (e.g., frequency rasters) to find a cell to connect to. Frequency rasters generally comprise the steps or frequencies that may be used by a communication device. For example, if the channel raster is 100 KHz, then a carrier frequency is a multiple of 100 KHz.

In LTE, frequency rasters are 100 KHz apart, and there may be many rasters in a frequency band to be searched over. A typical frequency scan includes searching each frequency raster one by one in an attempt to detect a cell. On each raster the UE tries to find a cell, for example, by detecting a reference signal (e.g., synchronization signal). If the UE detects a cell while searching on a particular frequency raster, the UE may return the detected cell as a result of the search and either continues searching to find more cells or may terminate the search. If the UE does not detect a cell on a particular frequency raster after searching the raster for a predefined amount of time (e.g., dwell time T), the UE proceeds to search the next raster. A dwell time (T) generally refers to an amount of time a UE is configured to search a particular frequency raster before moving on to the next frequency raster.

In certain aspects, to support operation of a UE at very low SNR, the dwell time (T) may need to be chosen large enough to increase chances of detecting a cell at a very low SNR (e.g., −12 dB). For example, to detect a cell at −12 dB, T may need to be set to about 500 msec. In certain aspects, long dwell times may result in very long and power consuming scan operations. Further, as NB-IoT system bandwidth is 180 KHz and raster spacing is 100 KHz, a significant portion of a signal transmitted in a cell on a raster n is generally visible on an adjacent raster (e.g., n+1 or n−1). Consequently, a cell on raster (n) may be wrongly detected on an adjacent raster (n+1).

Certain aspects of the present disclosure discuss frequency scan procedures, for example in NB-IoT systems, for efficient and accurate detection of cells.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. UEs 120 may be configured to perform the operations 1300 in FIG. 13 and methods described herein for efficient and accurate frequency scanning to detect cells. BS 110 may comprise a transmission gNB, reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to an example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices and/or Internet of Things (IoT) devices. MTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC and/or IoT UEs include NB-IoT devices, enhanced MTC (eMTC) devices, etc.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
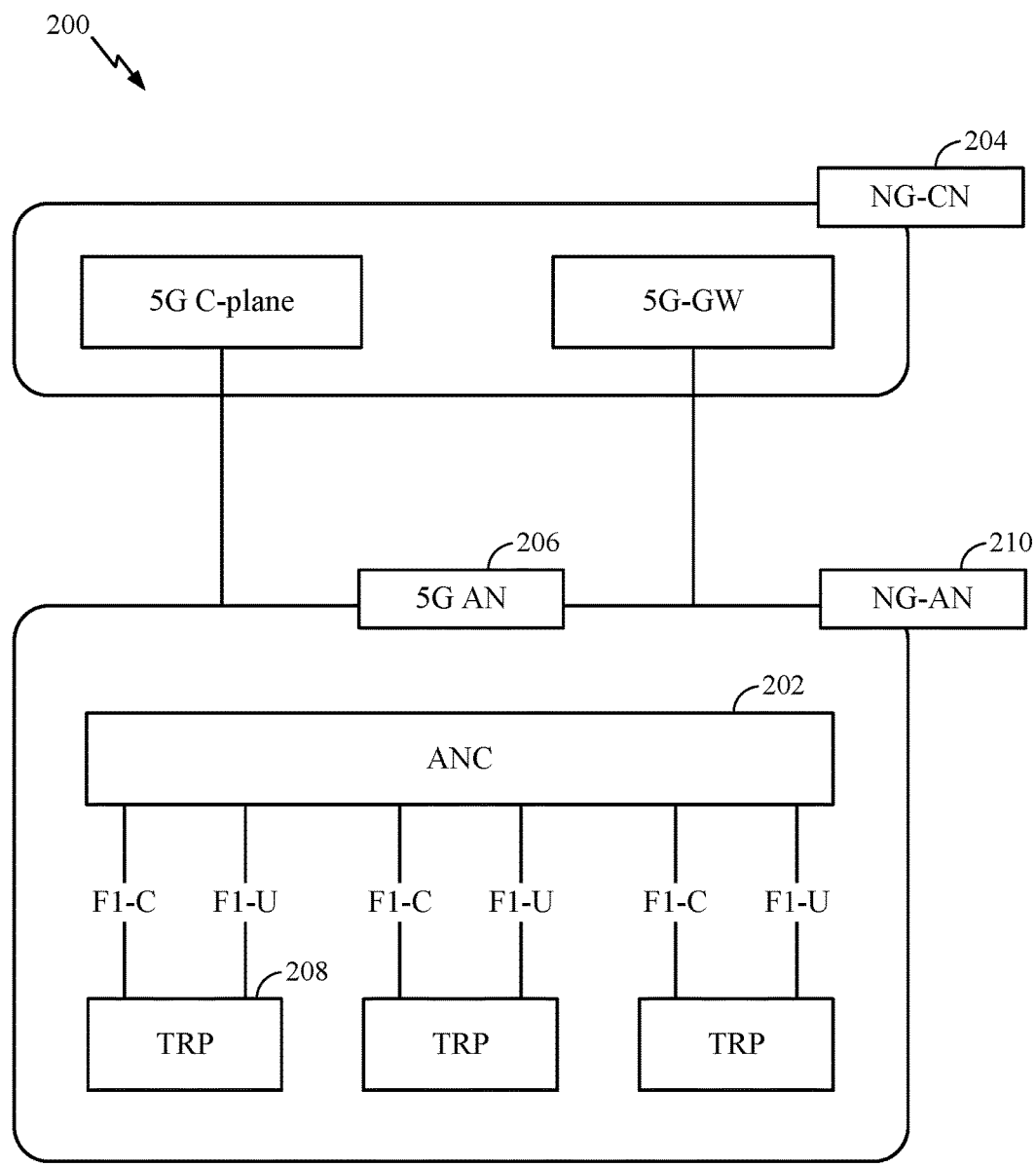
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
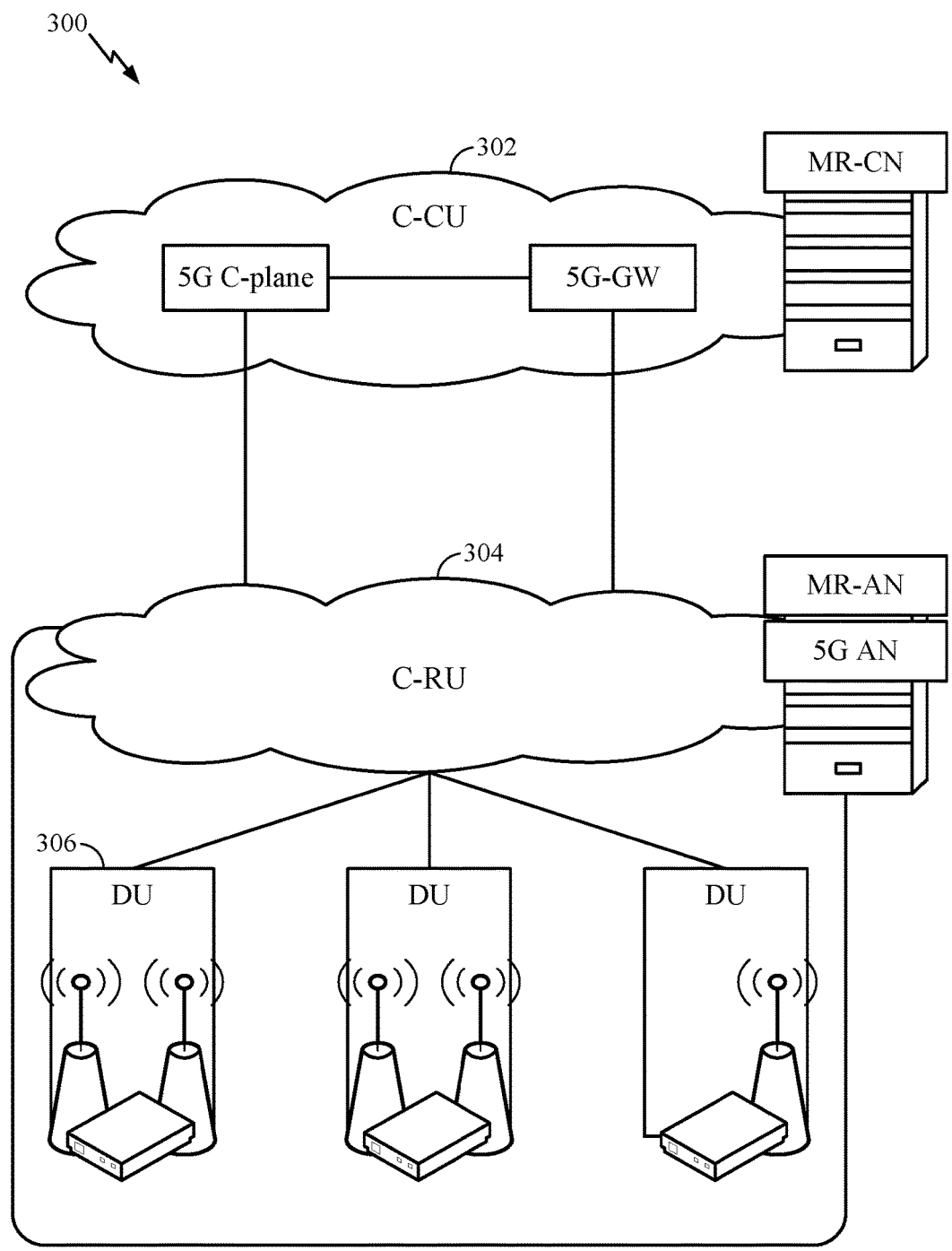
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
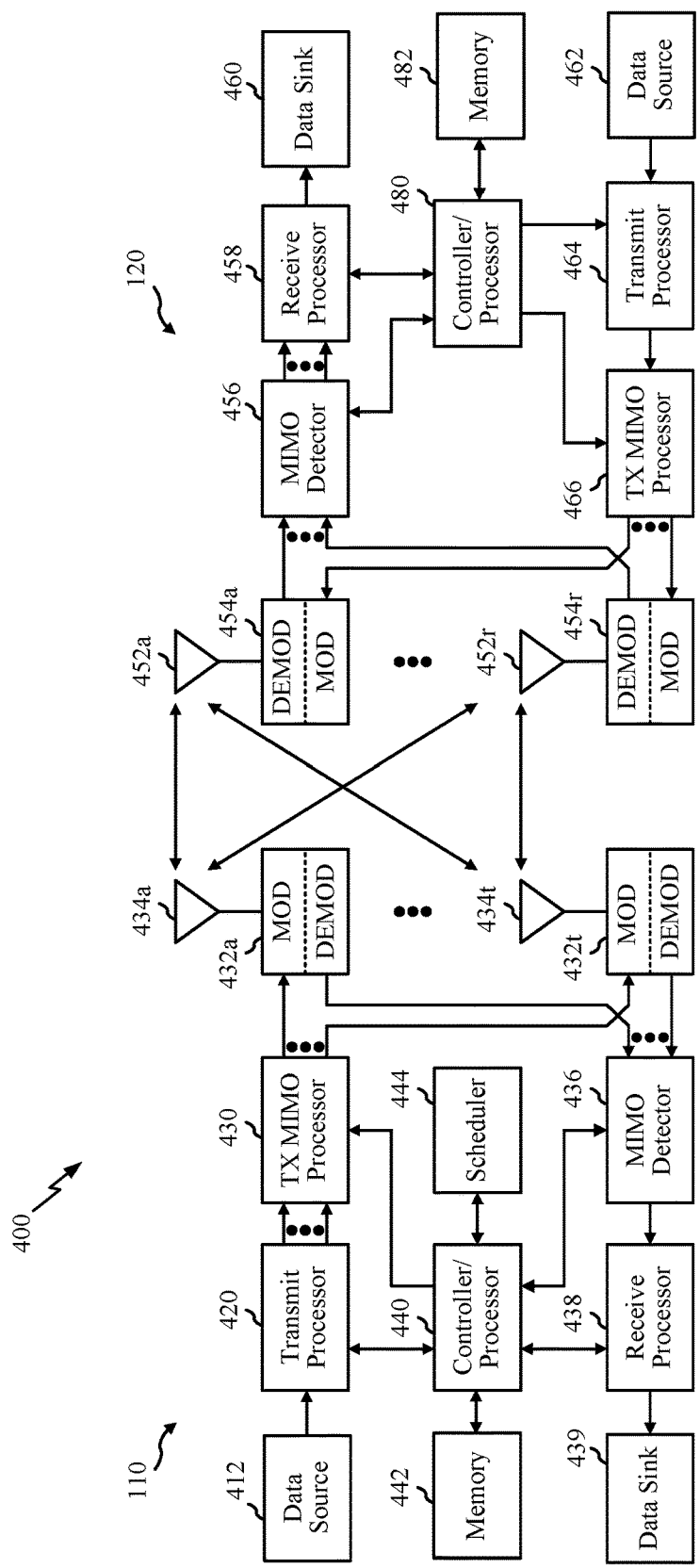
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave (millimeter wave) frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 7-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct, e.g., the operations illustrated in FIG. 13, and/or other operations and/or processes for the techniques described herein. The processor 440 and/or other processors and modules at the base station 110 may perform or direct, e.g., other operations and/or processes for the techniques described herein. The memories 442 and 482 may store data and program codes for the BS 110 and the UE 120, respectively. A scheduler 444 may schedule UEs for data transmission on the downlink and/or uplink.

Figure 5:
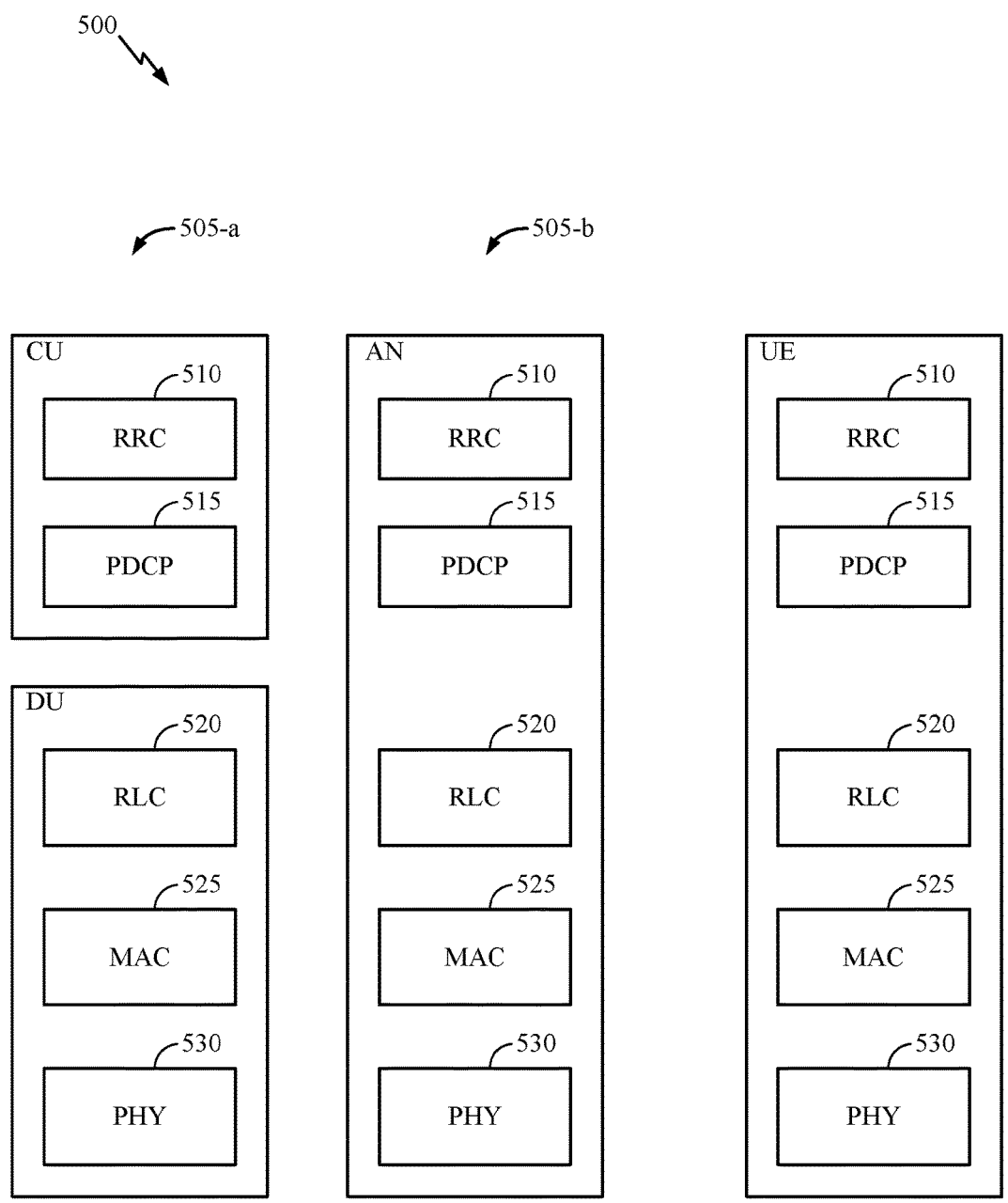
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
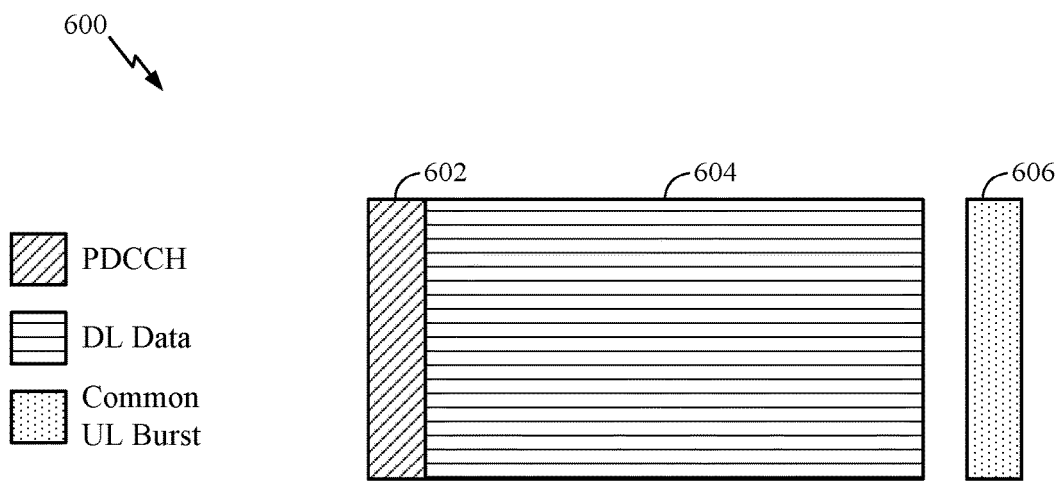
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe.

The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
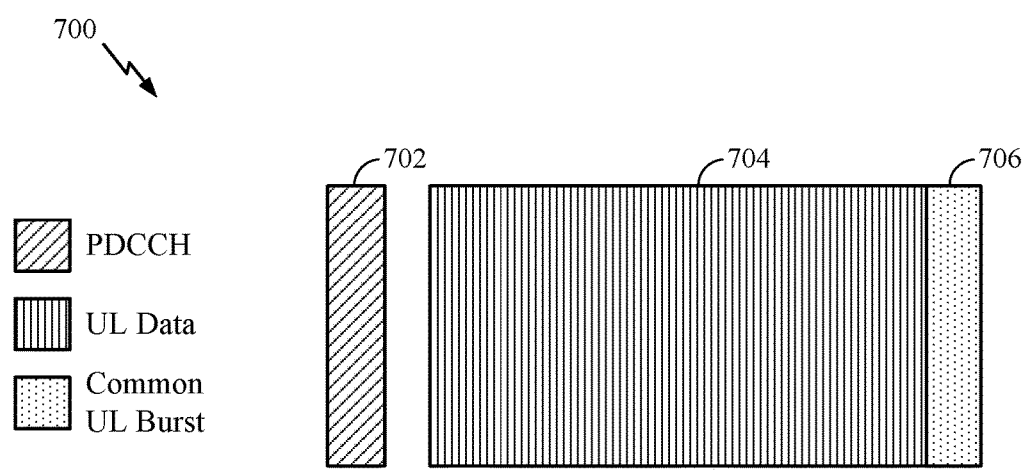
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Synchronization Signal Block Design

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be transmitted on different beams to achieve beam-sweeping for sync signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

Figure 8:
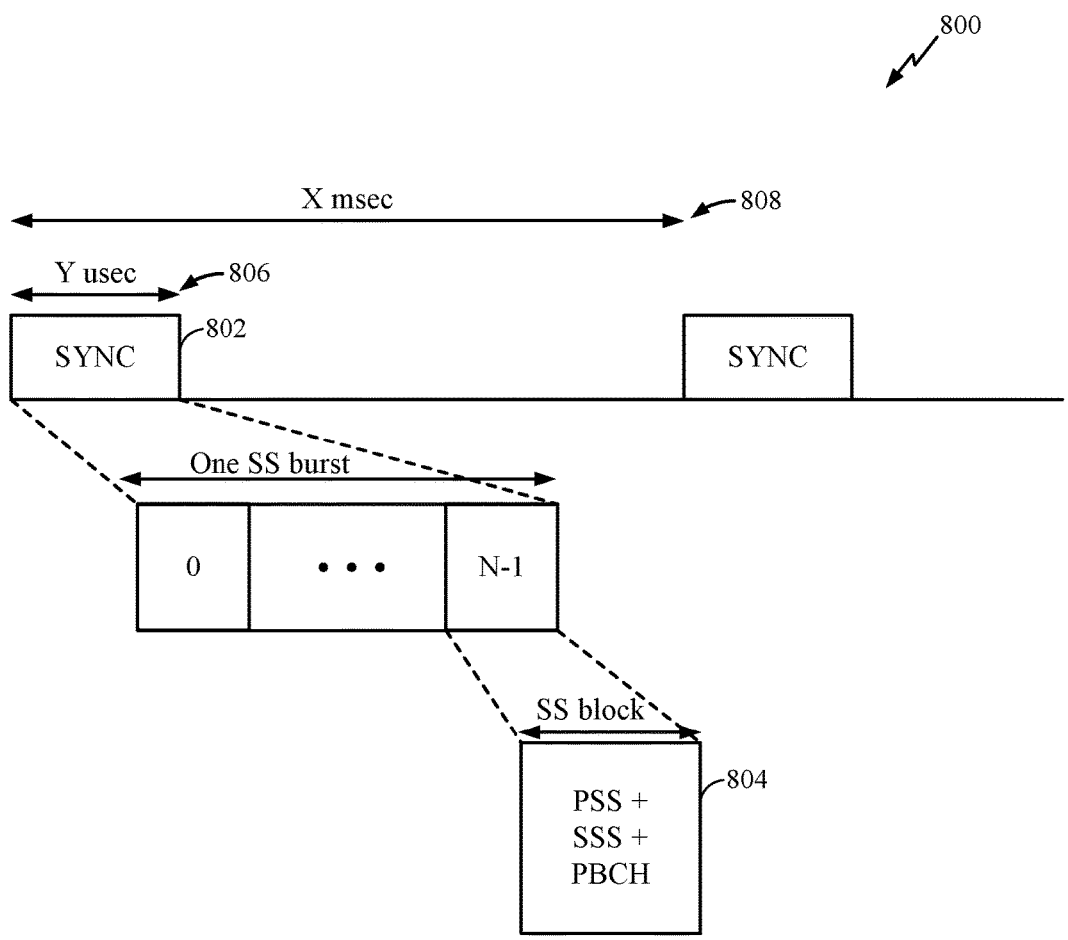
FIG. 8 example transmission timeline of synchronization signals for a new radio telecommunications system, in accordance with aspects of the present disclosure.

FIG. 8 illustrates an example transmission timeline 800 of synchronization signals for a new radio (NR) telecommunications system, in accordance with aspects of the present disclosure. A BS, such as BS 110 shown in FIG. 1, may transmit an SS burst 802 during a period 806 of Y μsec, in accordance with certain aspects of the present disclosure. The SS burst may include N SS blocks 804 with indices of zero to N−1, and the BS may transmit different SS blocks of the burst using different transmit beams (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
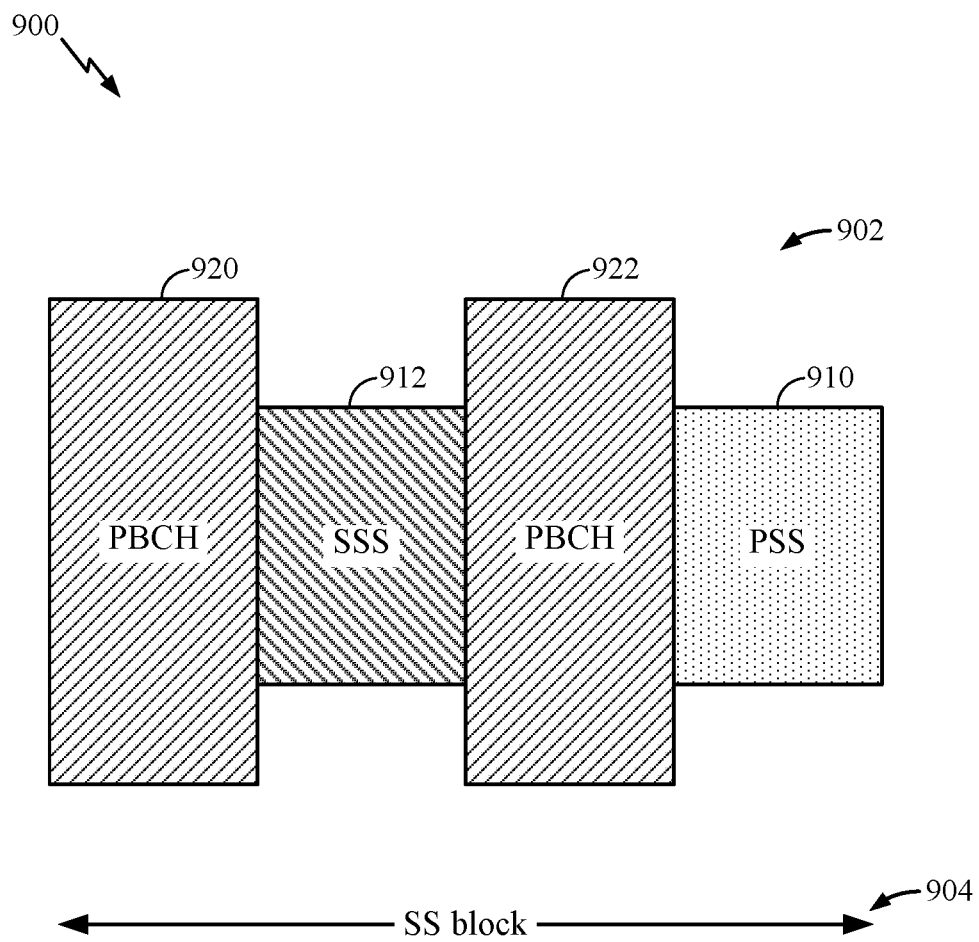
FIG. 9 illustrates an example resource mapping for an exemplary SS block, in accordance with aspects of the present disclosure.

FIG. 9 illustrates an example resource mapping 900 for an exemplary SS block 902, in accordance with aspects of the present disclosure. The exemplary SS block 902 may be transmitted by a BS, such as BS 110 in FIG. 1, over a period 904 (e.g., Y μsec, as shown in FIG. 8). The exemplary SS block includes a PSS 910, an SSS 912, and two PBCHs 920 and 922, although the disclosure is not so limited, and an SS block may include more or fewer synchronization signals and synchronization channels. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

Narrow Band Internet of Things (NB IOT)

The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Narrow-Band IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices.

NB-IoT devices may communicate using relative narrowband regions of system bandwidth. To reduce the complexity of UEs, NB-IoT may allow for deployments utilizing one Physical Resource Block (PRB) (180 kHZ+20 kHZ guard band). NB-IoT deployments may utilize higher layer components of LTE and hardware to allow for reduced fragmentation and cross compatibility with, for example, NB-LTE and eMTC.

Figure 10:
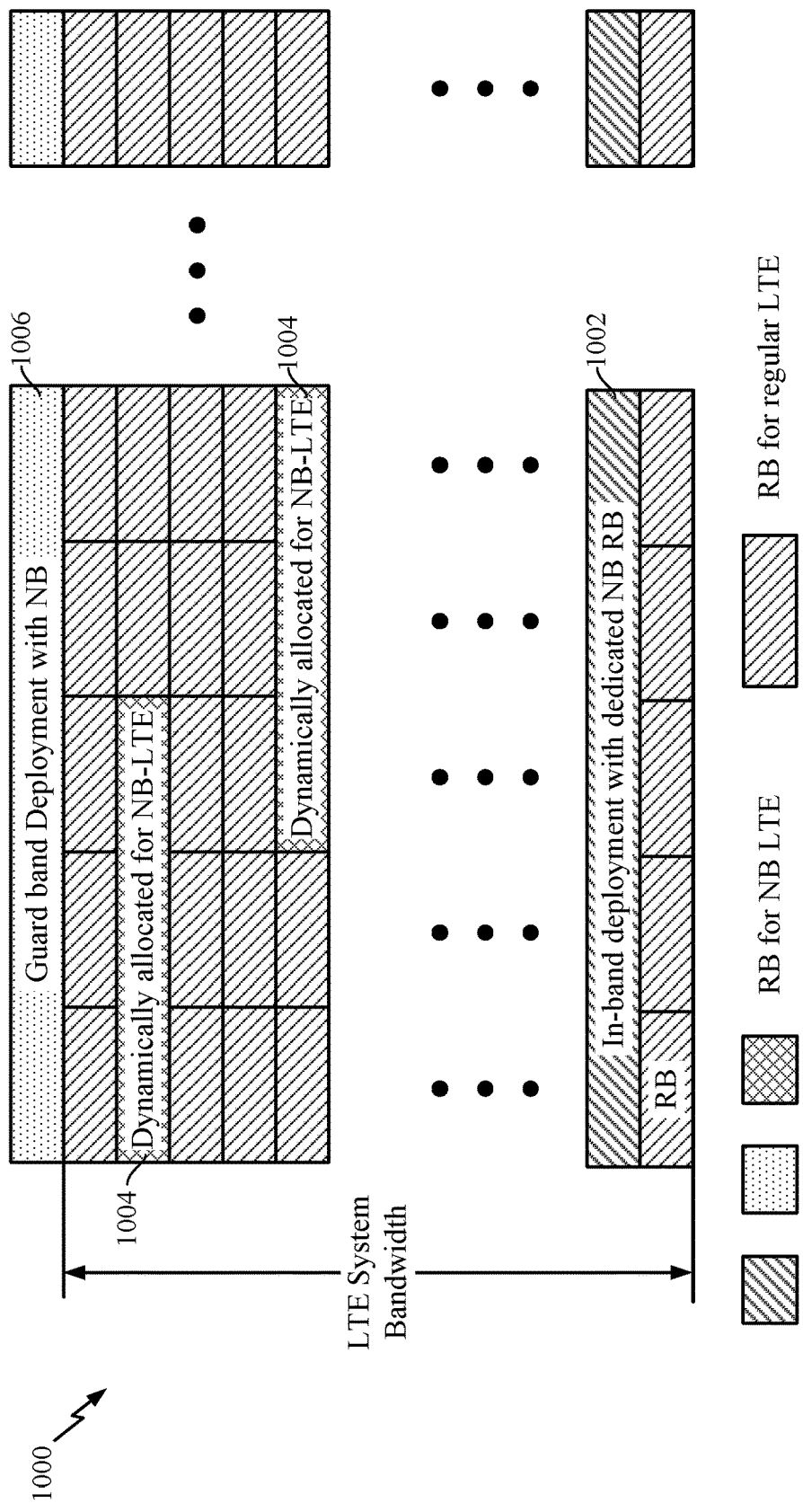
FIG. 10 illustrates an example deployment of NB-IoT, according to certain aspects of the present disclosure.

FIG. 10 illustrates an example deployment 1000 of NB-IoT, according to certain aspects of the present disclosure. According to certain aspects, NB-IoT may be deployed in three broad configurations. In certain deployments, NB-IoT may be deployed in-band and coexist with legacy GSM/WCDMA/LTE system(s) deployed in the same frequency band. Wideband LTE channel, for example, may be deployed in, e.g., various bandwidths between 1.4 MHz to 20 MHz, and there may be a dedicated RB 1002 available for use by NB-IoT, or the RBs allocated for NB-IoT may be dynamically allocated 1004. In an in-band deployment, one resource block (RB), or 200 kHz, of a wideband LTE channel may be used for NB-IoT. LTE implementations may include unused portions of radio spectrum between carriers to guard against interference between adjacent carriers. In some deployments, NB-IoT may be deployed in a guard band 1006 of the wideband LTE channel. In other deployments, NB-IoT may be deployed standalone (not shown). In a standalone deployment, one 200 kHz carrier may be utilized to carry NB-IoT traffic and GSM spectrum may be reused.

Deployments of NB-IoT, may include synchronization signals such as PSS for frequency and timing synchronization and SSS to convey system information. According to certain aspects of the present disclosure, synchronization signals of NB-IoT operations occupy narrow channel bandwidths and can coexist with legacy GSM/WCDMA/LTE system(s) deployed in the same frequency band. NB-IoT operations may include PSS/SSS timing boundaries. In certain aspects, these timing boundaries may be extended as compared to the existing PSS/SSS frame boundaries in legacy LTE systems (e.g., 10 ms) to, for example, 40 ms. Based on the timing boundary, a UE is able to receive a PBCH transmission, which may be transmitted in subframe 0 of a radio frame.

Example Frequency Scan Procedure in NB-IOT Systems

The objectives for NB-IOT devices generally include low cost, long battery life and wide coverage. In certain aspects, the target devices may be buried deep underground needing support for very weak communication links (e.g., as low as −12 dB SNR or even lower).

A UE during initial acquisition, for example when the UE device powers up, generally searches a list of frequency locations (e.g., frequency rasters) to find a cell to connect. Frequency rasters generally are the steps or frequencies that may be used by a communication device. For example, if the channel raster is 100 KHz, then a carrier frequency is a multiple of 100 KHz.

In LTE, frequency rasters are 100 KHz apart, and there may be many rasters in a frequency band to be searched over. A typical frequency scan includes searching each frequency raster one by one in an attempt to detect a cell. On each raster the UE tries to find a cell, for example, by detecting a reference signal (e.g., synchronization signal). If the UE detects a cell while searching on a particular frequency raster, the UE may return the detected cell as a result of the search and either continues searching to find more cells or may terminate the search. If the UE does not detect a cell on a particular frequency raster after searching the raster for a predefined amount of time (e.g., dwell time T), the UE proceeds to search the next raster. A dwell time (T) generally refers to an amount of time a UE is configured to search a particular frequency raster before moving on to the next frequency raster.

In certain aspects, to support operation of a UE at very low SNR, the dwell time (T) may need to be chosen large enough to increase chances of detecting a cell at a very low SNR (e.g., −12 dB). For example, to detect a cell at −12 dB, T may need to be set to about 500 msec. In certain aspects, long dwell times may result in very long and power consuming scan operations. Further, as NB-IoT system bandwidth is 180 KHz and raster spacing is 100 KHz, a significant portion of a signal transmitted in a cell on a raster n is generally visible on an adjacent raster (e.g., n+1 or n−1).

Figure 11:
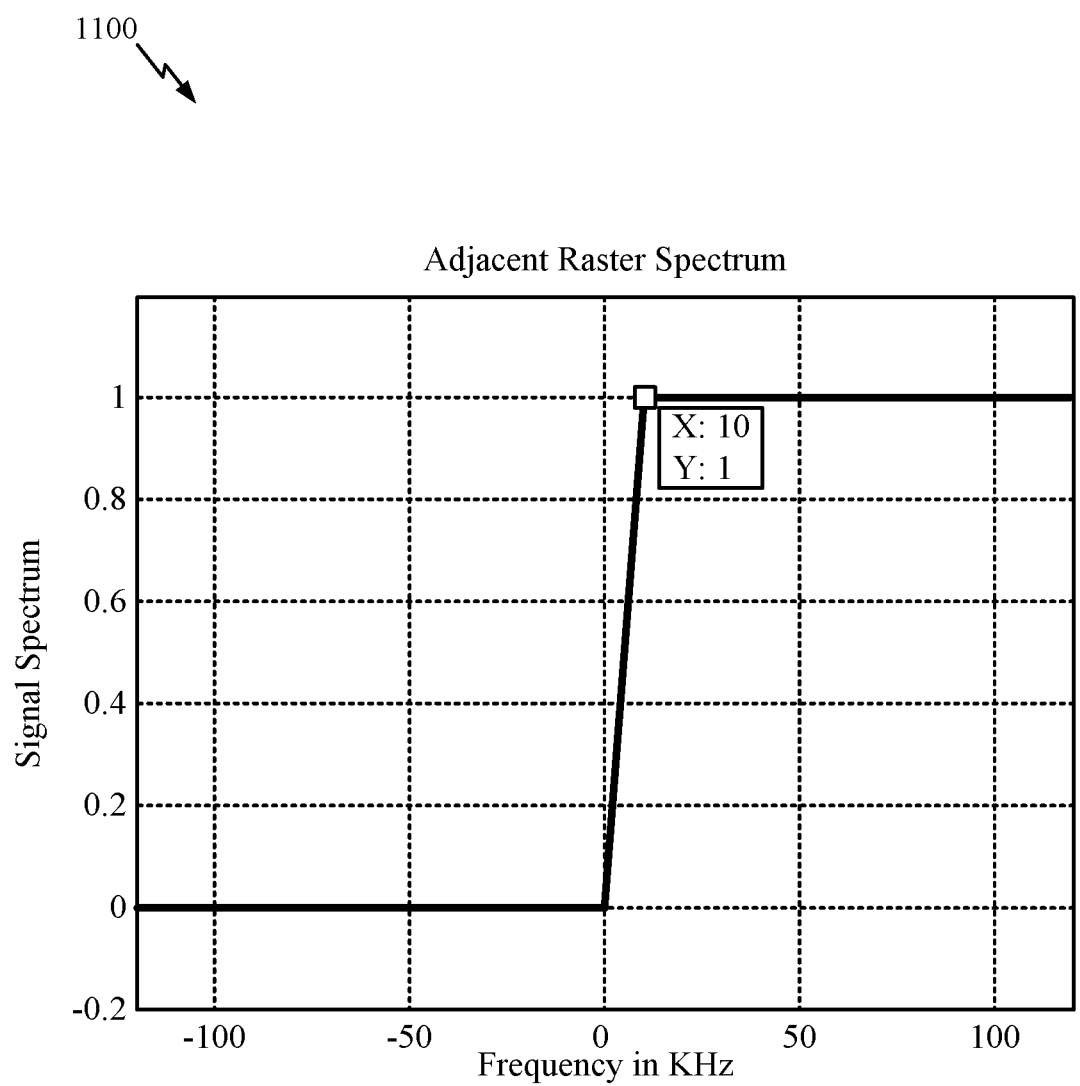
FIG. 11 illustrates an adjacent raster spectrum for an NB-IoT system, in accordance with certain aspects of the present disclosure. As shown, a significant portion of the signal transmitted by a cell at 0 KHz is visible.

FIG. 11 illustrates an adjacent raster spectrum for an NB-IoT system, in accordance with certain aspects of the present disclosure. As shown, a significant portion of the signal transmitted by a cell at 0 KHz is visible at 100 KHz.

In addition, the UE may have a large initial frequency offset (e.g., 20 ppm=18 KHz at carrier frequency of 900 MHz). This may result in an even larger portion of the signal transmitted on a particular raster to be visible on an adjacent raster.

Figure 12:
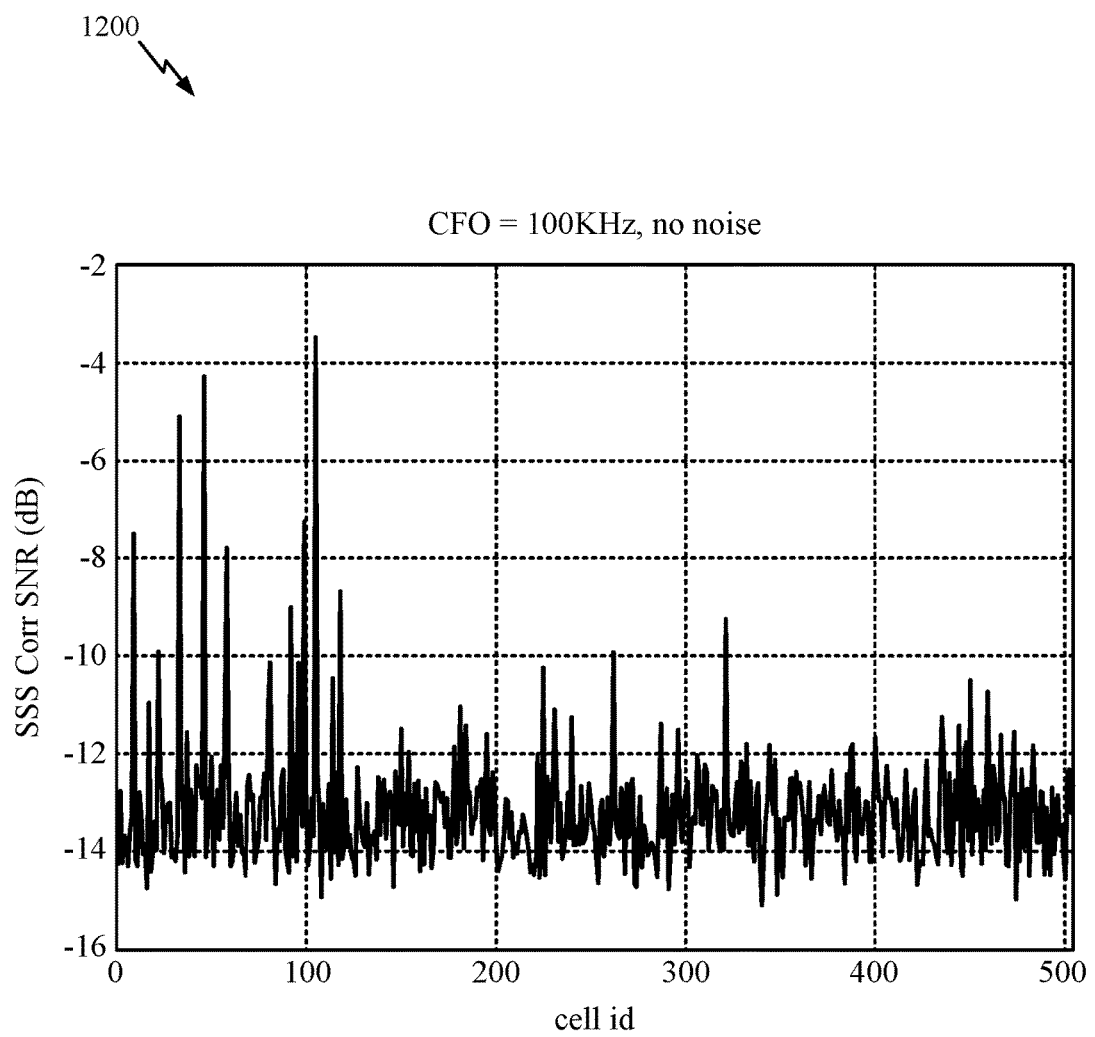
FIG. 12 illustrates SNR of a detected cell on an adjacent raster as a function of cell ids, in accordance with certain aspects of the present disclosure.

Further, it has been seen that for certain cell ids the detected cell on the adjacent (wrong) raster appears stronger as compared to certain other cell ids. FIG. 12 illustrates SNR of a detected cell on an adjacent raster as a function of cell ids, in accordance with certain aspects of the present disclosure. As shown in the figure, for certain cell ids the detected cell on the adjacent (wrong) raster appears stronger as compared to certain other cell ids.

Consequently, a cell on raster (n) may be wrongly detected on an adjacent raster (n+1).

Certain aspects of the present disclosure discuss frequency scan procedures, for example in NB-IoT systems, for efficient and accurate detection of cells.

Figure 13:
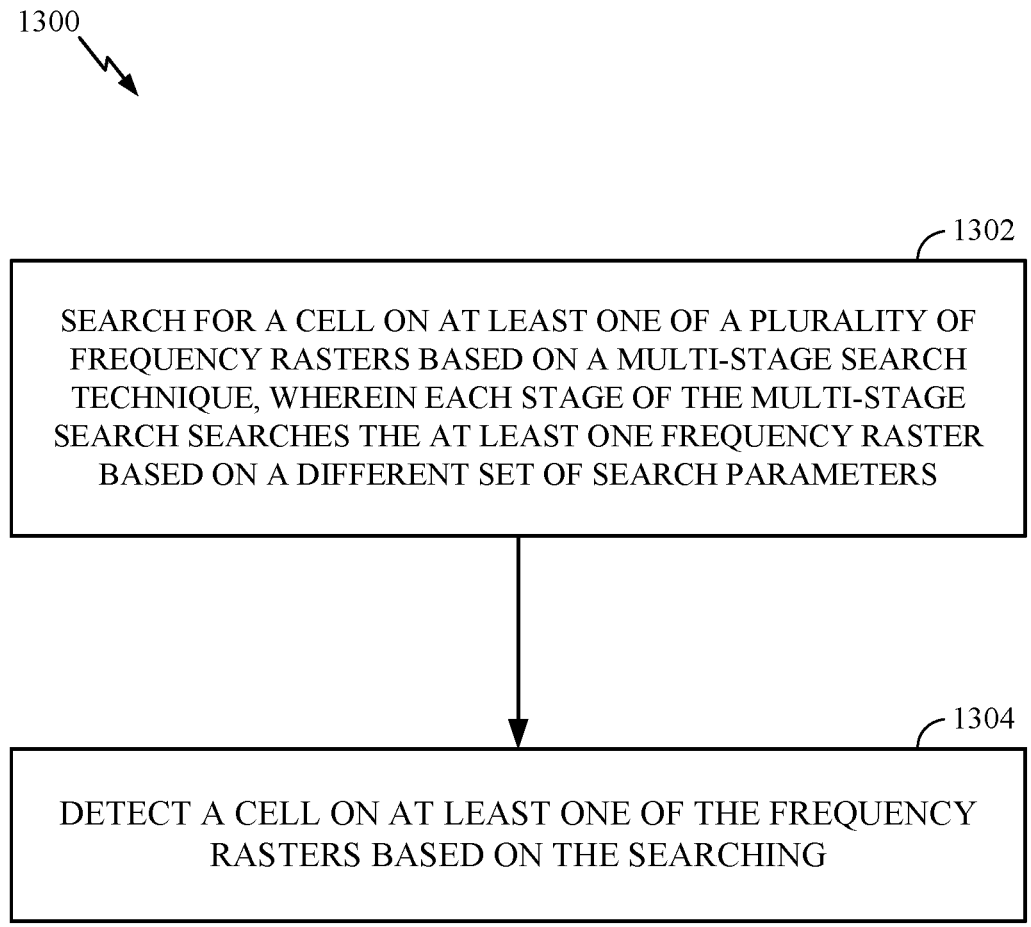
FIG. 13 illustrates example operations 1300 performed by a UE for efficient and accurate frequency scan procedures, in accordance with certain aspects of the present disclosure.

FIG. 13 illustrates example operations 1300 performed by a UE for efficient and accurate frequency scan procedures, in accordance with certain aspects of the present disclosure. Operations 1300 begin, at 1302, by searching for a cell on at least one of a plurality of frequency rasters based on a multi-stage search technique, wherein each stage of the multi-stage search searches the at least one frequency raster based on a different set of parameters. At 1304, the UE detects a cell on at least one of the frequency rasters based on the searching.

In certain aspects, each stage of the multi-stage technique may correspond to a different range of SNR. For example, a three stage search technique may be defined, a first stage designed to search cells with high SNR (e.g., high SNR>0 dB), a second stage designed to search cells with medium SNR (e.g., 0 dB>medium SNR>−8 dB), and a third stage designed to search cells with low SNR (e.g., −8 dB>low SNR>−12 dB). In an aspect, the search parameters for the different stages include different dwell times (T). In certain aspects, each stage may use a dwell time (T) designed to detect cells with SNRs in a range of SNRs corresponding to that stage. For example, referring to the three stage search technique discussed above, the first stage designed to search for cells with high SNRs may use the shortest dwell time, the third stage designed to search for cells with low SNRs may use the longest dwell time, and the second stage designed to search for cells with medium SNRs may use a dwell time that is somewhere in between the shortest and longest dwell times. In an aspect, the first, second and third stages may use dwell times T1, T2, and T3 respectively such that T1<T2<T3. For example, the first stage may use a dwell time of 50 msec, the second stage may use a dwell time of 150 msec, and the third stage may use a dwell time of 500 msec. Thus, each of the stages of the multi-stage search is designed to cover a particular SNR range.

In certain aspect, the UE may search one or more of a plurality of frequency rasters one stage at a time starting with the stage corresponding to the highest SNR. For example, referring to the three stage example, the UE may first search one or more frequency rasters according to stage 1 (fast search with shortest dwell times) to find a cell with high SNR. If the UE does not find a cell after the stage 1 scan is completed, the UE may search the one or more frequency rasters according to stage 2 (medium search with medium dwell times) to find a cell with medium SNR. If the UE does not find a cell after stage 2 scan is completed, the UE may search the one or more frequency rasters according to stage 3 (slow search with long dwell times) to find a cell with low SNR. In an aspect, the UE, upon detecting a cell in each stage, terminates the search and returns the detected cell as a result of the search procedure.

Figure 14:
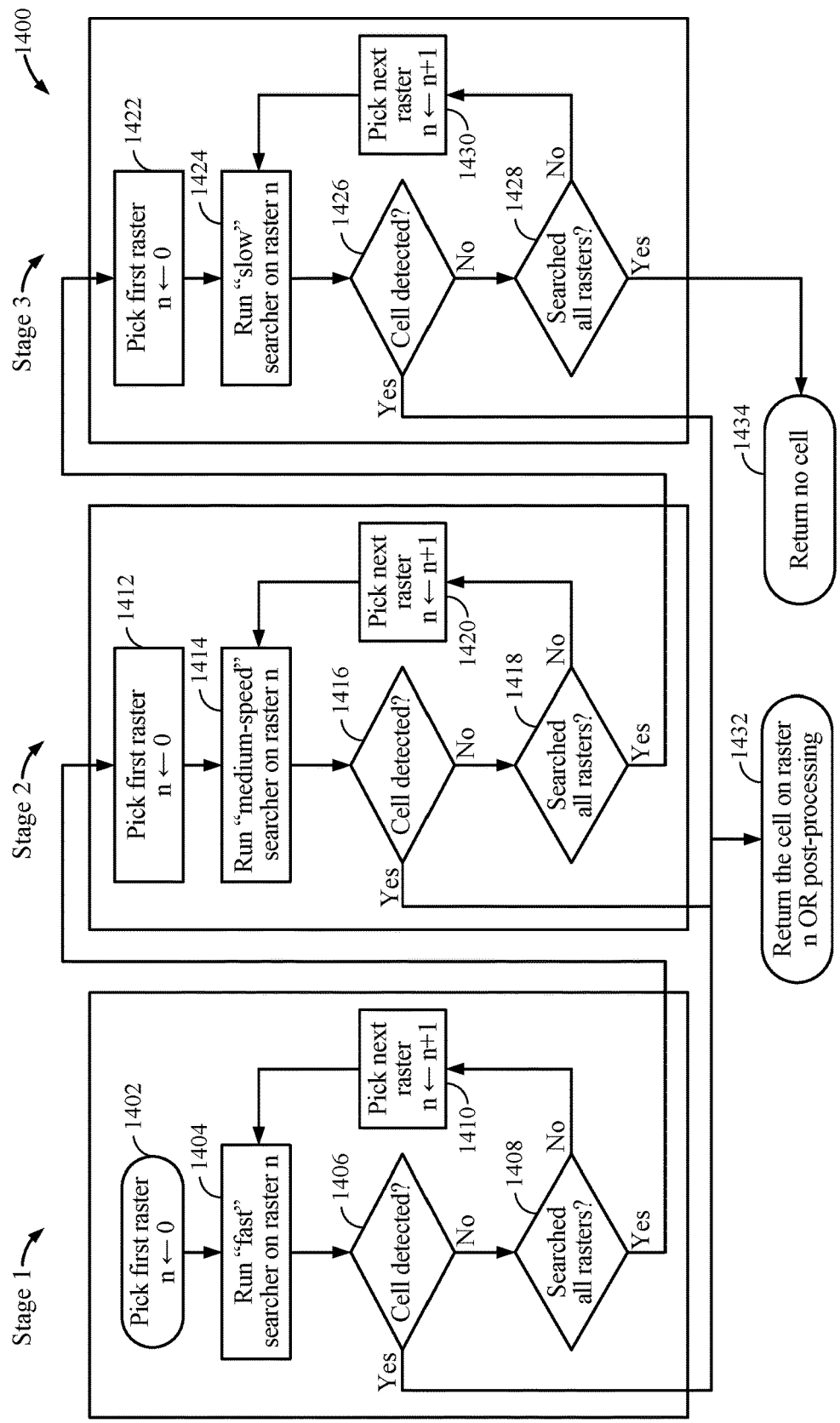
FIG. 14 illustrates example operations 1400 performed by a UE for performing a multi-stage search for cells, in accordance with certain aspects of the present disclosure.

FIG. 14 illustrates example operations 1400 performed by a UE for performing a multi-stage search for cells, in accordance with certain aspects of the present disclosure. As shown the multi-stage search includes stage 1-fast search, stage 2-medium search, and stage 3-slow search. The UE starts the search operation at stage 1. At 1402 the UE selects the first raster n of a plurality of rasters to be searched in an attempt to detect cells. At 1404, the UE runs a fast search on raster n, for example, using a short dwell time T (e.g., T=50 msec). At 1406, if the UE detects a cell based on the fast search of frequency raster n, the UE returns the detected cell on raster n as a result of the search at 1432. If the UE does not detect a cell on raster n, the UE checks if it has searched all frequency rasters that needed search at 1408. If the UE determines that all rasters have not been searched the UE increments the raster index by 1 (n→n+1) at 1410 and runs the fast search again on this next raster. The UE continues to search each of the plurality of rasters using the fast search until it finds a cell on one of the rasters or all frequency rasters have been searched.

At 1408 if the UE has searched all of the frequency rasters based on the fast search and has not found a cell, the UE proceeds to stage 2 of the multi-stage search. In stage 2, the UE, from 1412 to 1418, searches each frequency raster based on a medium speed search, for example, using a medium length dwell time T (e.g., T=150 msec). At any point during the medium speed search, if the UE finds a cell (for example, at 1416), the UE returns the detected cell as the result of the search procedure.

At 1418, if the UE has searched all of the frequency rasters based on the medium speed frequency search and has not found a cell, the UE proceeds to stage 3 of the multi-stage search. In stage 3, the UE, from 1422 to 1428, searches each frequency raster based on a slow search, for example, using a long dwell time T (e.g., 500 msec). At any point during the slow search, if the UE finds a cell (e.g., at 1226), the UE returns the detected cell as the result of the search procedure. At 1428, if the UE fails to detect a cell after searching all rasters based on the slow search, the UE returns no cell at 1434 indicating that no cell was detected on any of the frequency rasters.

In certain aspects, when the frequency scan at stage k of the multi-stage search returns a cell detected on raster n, the UE may run an extra confirmation stage whose purpose is to ensure that the detected cell on raster n is correctly detected and it is not a portion of another cell on an adjacent raster (e.g., raster n−1 or n+1). In certain aspects, the confirmation stage includes checking if the detected cell on raster n meets a predefined performance criterion. In an aspect, if the cell meets the performance criterion, the UE returns the cell as a correctly detected cell on raster n. On the other hand, if the detected cell does not meet the performance criterion, the UE performs additional processing including an additional search on adjacent frequency rasters, to detect a correct cell on a correct raster.

In certain aspects, the performance criterion may be a function of one performance metric or a combination of two or more performance metrics of a set of performance metrics of the detected cell. The set of performance metrics may include quality of the detected cell, identification of the detected cell (cell id), a raster index n of the detected cell (e.g., raster on which the cell was detected), a stage index k of the detected cell (e.g., the stage of the multi-stage search in which the cell was detected), timing of the detected cell, and frequency of the detected cell. For example, the performance criterion may be that the SNR of the detected cell is higher than a Threshold SNR, wherein the threshold SNR is a function of the cell id of the detected cell, a raster index n of the detected cell, and a stage index k of the detected cell. Thus, the detected cell on raster n is returned as the correctly detected cell, only if the SNR of the detected cell is higher than the threshold SNR. If not, the UE performs additional processing discussed below. In an aspect, different sets of cell ids may be defined and a different threshold SNR is assigned to each set of cell IDs. The SNR of the detected cell is compared against the threshold SNR assigned to the set of cell IDs to which the cell ID of the detected cell belongs to. In an example, threshold TH1 may be assigned to a first set of cell ids and a threshold TH2 may be assigned to a second set of cell ids, wherein TH1>TH2.

In certain aspects, as noted above, if the detected cell on raster n fails to meet the performance criterion, the UE may perform some additional processing based on one or more parameters corresponding to the detected cell, to correctly detect a cell on a corresponding correct raster. In certain aspects, the additional processing may include running an additional search (e.g., the multi-stage search) on at least one frequency raster adjacent to the raster n (e.g., raster n−1 or n+1). The UE may determine what cell and raster to return as a result of the search/scan based on a result of the additional search and the initial search.

In certain aspects, at least one parameter for performing the additional processing (e.g., additional searching) is a function of one or more performance metrics of the detected cell. In certain aspects, the performance metrics for the additional processing may include quality of the detected cell, cell id of the detected cell, a raster index n of the detected cell, a stage index k corresponding to the detected cell, timing of the detected cell, and frequency of the detected cell. For example, the additional searching on an adjacent raster (e.g., n+1) is limited to at least one of a timing window or a frequency window based on at least one of the estimated timing or estimated frequency of the detected cell. In another example, a dwell time for the additional searching on an adjacent frequency raster is a function of at least one of a stage k of the multi-stage search in which the cell was detected, or an SNR of the detected cell. In another example, the additional searching on an adjacent raster is limited to a subset of cell ids as a function of at least one of a cell id of the detected cell, or an SNR of the detected cell.

In certain aspects, if the UE detects a cell on an adjacent frequency raster (e.g., n−1 or n+1), the UE compares performance metrics of the cell detected on the adjacent raster with the performance metrics of the cell detected on raster n, and determines what cell and raster to return based on the comparison. For example, if the cell detected on raster n+1 is stronger (e.g., higher SNR) than the cell detected on raster n with some margin X (say 0 dB or 3 dB), then the UE returns the cell on raster n+1 as the result of the searching. Additionally or alternatively, the decision may depend on the ids of the two cells detected on rasters n and n+1. Additionally or alternatively, the decision may depend on the relative timing of the two cells detected on raster n and raster n+1.

Figure 15:
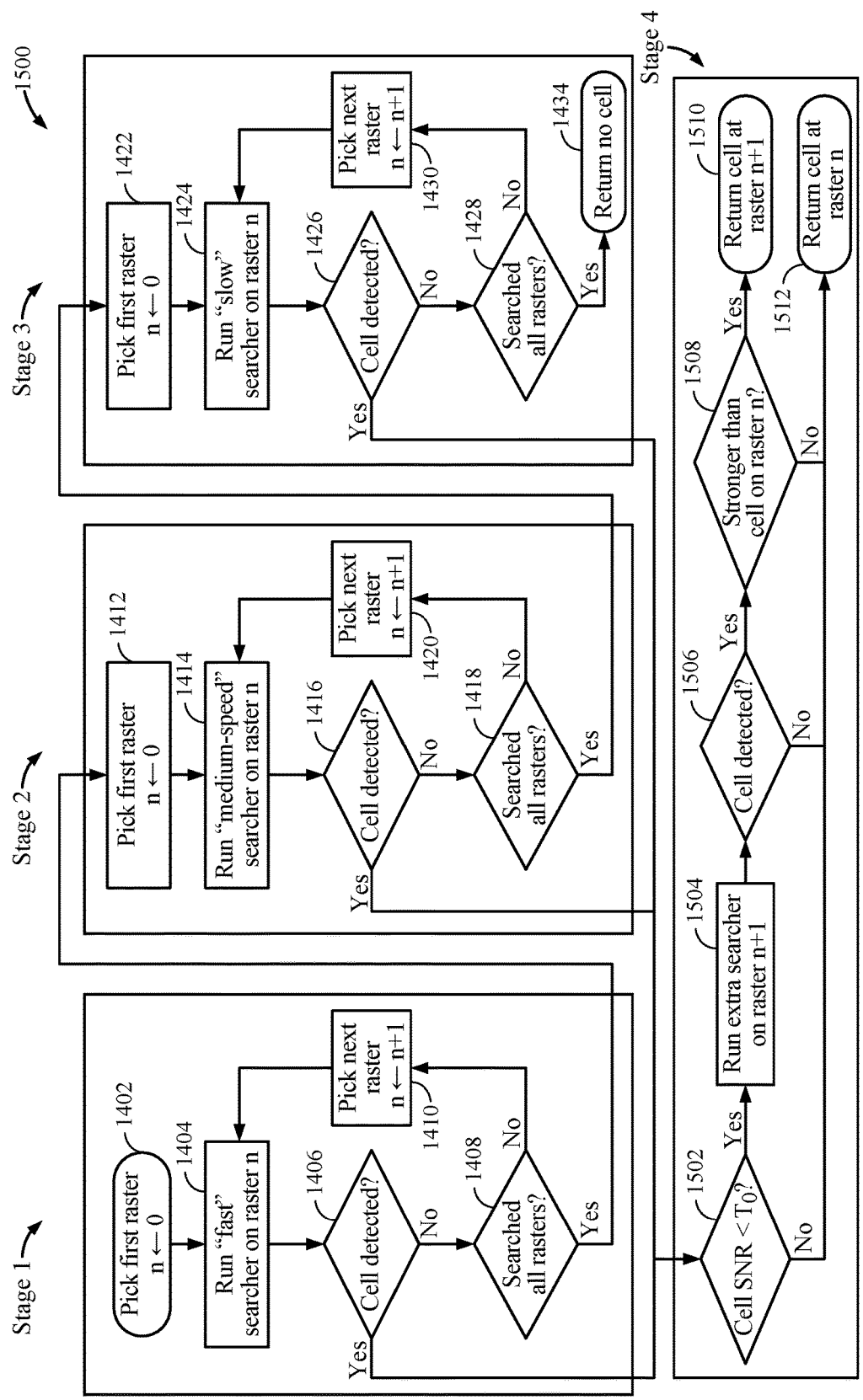
FIG. 15 illustrates example operations 1500 performed by a UE for performing a multi-stage search for cells including an additional processing stage, in accordance with certain aspects of the present disclosure.

FIG. 15 illustrates example operations 1500 performed by a UE for performing a multi-stage search for cells including an additional processing stage, in accordance with certain aspects of the present disclosure. Steps 1402 to 1428, and 1434 are same as illustrated in FIG. 14 and as described above with respect to FIG. 14. Thus, these steps will not be described again. At any of the steps 1406, 1416 or 1426, if the UE detects a cell on raster n, the UE performs the additional processing at stage 4. In stage 4, the UE first checks, at 1502, if the detected cell meets a performance criterion. For example, the UE checks if the SNR of the detected cell is less than a threshold SNR ($T_0$). If not, the UE, at 1512, returns the cell detected at raster n as the result of the multi-stage search. However, if the UE determines that the SNR of the detected cell is lower than the threshold SNR, the UE runs an extra search at 1504 on adjacent raster n+1. At 1506, if the UE does not detect a cell on the adjacent raster n+1, the UE returns the cell detected at raster n as the result of the multi-stage search. However, if the UE detects a cell on raster n+1, the UE, at 1508, checks if the cell detected on raster n+1 is stronger (e.g., higher SNR) than the cell detected on raster n. If yes, the UE, at 1510, returns the cell detected on raster n+1 as the result of the multi-stage search. If not, the UE, at 1512, returns the cell detected on raster n as the result of the multi-stage search.

In certain aspects, in order to reduce synchronization latency, while supporting a wide range of SNRs (e.g., low to high SNRs), searching a frequency raster for a cell may include processing multiple instance of a synchronization signal (e.g., PSS and/or SSS) based on a set of threshold values, and detecting a cell on the frequency raster based on the processing. In an aspect, processing multiple instances of a received synchronization signal may improve reliability, for example, increase detection probability and/or reduce (time/frequency) estimation errors. The UE may process multiple hypotheses and find the best one by processing multiple instances of a sync signal. Each hypothesis corresponds to a combination of two or more parameters including time, frequency, cell identity, or x msec boundaries.

In certain aspects, processing an instance includes correlating received samples of the instance with a set of reference signals, combining results of the correlating of multiple instances, and comparing the result of the combining (e.g., a correlation value) with one of a set of threshold values. In an aspect, the set of threshold values includes a threshold value corresponding to each of the multiple instances. Further, threshold values in the set are arranged in descending order (e.g., threshold ramp), the highest threshold value corresponding to the first processing instance, the second highest value corresponding to the second processing instance and so on. For example, the set of threshold value may include values Th1, Th2 . . . ThN if instances 1, 2, . . . . N of a received sync signal are being processed, where Th1>=Th2>= . . . >=ThN.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for searching, means for detecting, means for terminating, means for identifying, means for determining, means for performing, means for processing, means for correlating, means for combining, means for arranging, means for attempting, means for measuring, means for using, means for selecting, means for transmitting, means for receiving, means for sending, means for comparing, means for repeating, means for increasing, and/or means for decreasing may include one or more processors/controllers, transmitters, receivers, antennas, and/or other elements of the user equipment 120 and/or the base station 110 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
    searching for a cell on a plurality of frequency rasters based on a multi-stage search,
    wherein the UE, in each stage of the multi-stage search, is configured to search the plurality of frequency rasters for a different dwell time, the dwell time corresponding to an amount of time the UE searches a frequency raster for, wherein the dwell time for each stage of the multi-stage search is configured to search cells associated with a different range of Signal to Noise Ratios (SNRs), wherein the UE searches the plurality of frequency rasters one stage at a time starting from a stage corresponding to the smallest dwell time and in ascending order of dwell times; and
    detecting a cell on at least one of the plurality of frequency rasters based on the searching.

2. The method of claim 1, wherein the UE terminates the searching in response to detecting the cell.

3. The method of claim 1, further comprising:
    upon detecting a cell x on frequency raster n in stage k of the multi-stage search, determining if the detected cell x satisfies a performance criterion;
    determining that the cell x is correctly detected on raster n, if the detected cell satisfies the performance criterion; and
    performing additional processing if the detected cell x fails to satisfy the performance criterion.

4. The method of claim 3, wherein the performance criterion is a function of one or a combination of two or more performance metrics of a set of performance metrics of the detected cell, the set of performance metrics including at least one of: quality of the detected cell, identity of the detected cell, a raster index of the detected cell, a stage index, timing of the detected cell, or frequency of the detected cell.

5. The method of claim 3, wherein the performance criterion includes a Signal to Noise Ratio (SNR) of the detected cell being higher than a threshold SNR, the threshold SNR being a function of: a cell identity (ID) of the detected cell, a raster index of the detected cell, a stage index of the stage of the multi-stage search during which the cell was detected, or combinations thereof.

6. The method of claim 5, wherein the cell ID of the detected cell is from a first set of cell IDs assigned a first threshold SNR, the first threshold SNR chosen as the threshold SNR for the performance criterion, wherein the first threshold SNR is different from a second threshold SNR assigned to a second set of cell IDs different from the first set.

7. The method of claim 3, wherein at least one parameter for performing the additional processing is a function of one or more performance metrics of the detected cell.

8. The method of claim 7, wherein the performance metrics include quality of the detected cell, identify of the detected cell, a raster index of the detected cell, a stage index, timing of the detected cell, frequency of the detected cell, or combinations thereof.

9. The method of claim 3, wherein the additional processing includes further searching for a cell on at least one frequency raster adjacent to the frequency raster n, wherein the further searching is limited to at least one of a timing window or a frequency window based on at least one of an estimated timing or an estimated frequency of the detected cell.

10. The method of claim 3, wherein the additional processing includes further searching for a cell on at least one frequency raster adjacent to the frequency raster n, and wherein a dwell time for the further searching is a function of at least one of a stage of the multi-stage search in which the cell was detected or an SNR of the detected cell, the dwell time corresponding to an amount of time the UE searches a frequency raster for.

11. The method of claim 3, wherein the additional processing includes further searching for a cell on at least one frequency raster adjacent to the frequency raster n, wherein the further searching is limited to a subset of cell identities (IDs) as a function of at least one of a cell ID of the detected cell or an SNR of the detected cell.

12. The method of claim 3, wherein the additional processing comprises:
    searching for a cell on at least one frequency raster adjacent to the frequency raster n;
    detecting a cell y based on the searching on the at least one adjacent frequency raster;
    comparing performance metrics of the cell y with performance metrics of cell x; and
    determining cell y or cell x as a correctly detected cell on a corresponding frequency raster, based on the comparison.

13. The method of claim 12, wherein the determining the cell y or cell x comprises designating one of cell y or cell x with a stronger detected SNR as the correctly detected cell.

14. The method of claim 12, wherein the determining the cell y or cell x is a function of cell identities of the cells y and x.

15. The method of claim 12, wherein the determining the cell y or cell x is a function of relative timing of the cells y and x.

16. The method of claim 3, wherein the additional processing comprises:
searching for a cell on at least one frequency raster adjacent to the frequency raster n;
determining that the cell is correctly detected on the frequency raster n, if no cell is detected on the at least one adjacent frequency raster.

17. The method of claim 1, wherein searching the plurality of frequency rasters comprises searching each of the plurality of frequency rasters, and wherein searching each of the plurality of frequency rasters comprises:
processing multiple instances of a synchronization signal received on the frequency raster of the plurality of frequency rasters based on a set of threshold values.

18. The method of claim 17, wherein the set of threshold values includes a threshold value corresponding to each of the multiple instances.

19. The method of claim 18, wherein threshold values in the set are arranged in descending order, the highest threshold value corresponding to a first processing instance.

20. The method of claim 17, wherein the synchronization signal includes at least one of a Primary Synchronization Signal (PSS) or a Secondary Synchronization Signal (SSS).

21. The method of claim 17, wherein processing the multiples instances of the synchronization signal comprises:
for each instance, correlating received samples of the instance with a set of reference signals; and
combining results of the correlating for the multiple instances; and
comparing a result of the combining with one of the set of threshold values.

22. The method of claim 17, wherein each of the multiple instances of the synchronization signal corresponds to a combination of two or more parameters including time, frequency, cell identity, or x msec boundaries.

23. An apparatus for wireless communication by a User Equipment (UE), comprising:
means for searching for a cell on a plurality of frequency rasters based on a multi-stage search,
wherein the means for searching, in each stage of the multi-stage search, is configured to search the plurality of frequency rasters for a different dwell time, the dwell time corresponding to an amount of time a frequency raster is searched for, wherein the dwell time for each stage of the multi-stage search is configured to search cells associated with a different range of Signal to Noise Ratios (SNRs), wherein the means for searching searches the plurality of frequency rasters one stage at a time starting from a stage corresponding to the smallest dwell time and in ascending order of dwell times; and
means for detecting a cell on at least one of the plurality of frequency rasters based on the searching.

24. An apparatus for wireless communication by a User Equipment (UE), comprising:
at least one processor configured to:
search for a cell on of a plurality of frequency rasters based on a multi-stage search,
wherein the at least one processor is configured to, in each stage of the multi-stage search, search the plurality of frequency rasters for a different dwell time, the dwell time corresponding to an amount of time the UE searches a frequency raster for, wherein the dwell time for each stage of the multi-stage search is configured to search cells associated with a different range of Signal to Noise Ratios (SNRs), wherein the plurality of frequency rasters are searched one stage at a time starting from a stage corresponding to the smallest dwell time and in ascending order of dwell times; and
detect a cell on at least one of the plurality of frequency rasters based on the searching; and
a memory coupled to the at least one processor.

25. A non-transitory computer-readable medium for wireless communication by a User Equipment (UE), the computer-readable medium storing instructions which when processed by at least one processor performs a method comprising:
searching for a cell on of a plurality of frequency rasters based on a multi-stage search,
wherein the searching comprises, in each stage of the multi-stage search, searching the plurality of frequency rasters for a different dwell time, the dwell time corresponding to an amount of time a frequency raster is searched for, wherein the dwell time for each stage of the multi-stage search is configured to search cells associated with a different range of Signal to Noise Ratios (SNRs), wherein the plurality of frequency rasters are searched one stage at a time starting from a stage corresponding to the smallest dwell time and in ascending order of dwell times; and
detecting a cell on at least one of the plurality of frequency rasters based on the searching.

* * * * *